US011192515B2

(12) United States Patent
Jayakar et al.

(10) Patent No.: US 11,192,515 B2
(45) Date of Patent: Dec. 7, 2021

(54) ROOF-MOUNTED OCCUPANT SAFETY SYSTEM FOR 360 DEGREE PROTECTION

(71) Applicant: ZF Passive Safety Systems US Inc., Washington, MI (US)

(72) Inventors: Hylus Ranjit Raj Jayakar, Shelby Township, MI (US); Kurt F. Fischer, Rochester, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 63 days.

(21) Appl. No.: 16/710,052

(22) Filed: Dec. 11, 2019

(65) Prior Publication Data

US 2021/0179005 A1    Jun. 17, 2021

(51) Int. Cl.
*B60R 21/231* (2011.01)
*B60R 21/214* (2011.01)
*B60R 21/01* (2006.01)
*B60R 21/268* (2011.01)

(52) U.S. Cl.
CPC ............ *B60R 21/231* (2013.01); *B60R 21/01* (2013.01); *B60R 21/214* (2013.01); *B60R 21/268* (2013.01); *B60R 2021/23192* (2013.01)

(58) Field of Classification Search
CPC ................ B60R 21/231; B60R 21/214; B60R 21/213; B60R 21/232; B60R 2021/23192; B60R 2021/23161; B60N 2/01; B60N 2/14; B60N 2/143; B60N 2/146; B60N 2/0292; B60N 2002/022

USPC ................... 280/728.2, 730.1, 743.1
See application file for complete search history.

(56) References Cited

U.S. PATENT DOCUMENTS

| 9,744,932 | B1 | 8/2017 | Faruque et al. |
| 9,789,840 | B2 | 10/2017 | Farooq et al. |
| 2018/0222432 | A1 | 8/2018 | Schneider |
| 2019/0241141 | A1* | 8/2019 | Sirous .................. B60R 21/232 |

FOREIGN PATENT DOCUMENTS

JP          2019130944 A  *  8/2019

* cited by examiner

*Primary Examiner* — Keith J Frisby
(74) *Attorney, Agent, or Firm* — Tarolli, Sundheim, Covell & Tummnio LLP (57) ABSTRACT

An airbag for helping to protect an occupant of a vehicle having a roof and a cabin with a seat for the occupant includes an upper portion for being mounted to a vehicle roof, a lower portion having a ring-shaped configuration configured to encircle the occupant and a seatback of the vehicle seat when deployed, and at least one pillar connecting the lower portion to the upper portion. The lower portion encircles the seatback configures the lower portion to utilize the seatback as a reaction surface for supporting the lower portion against movement in response to an impacting occupant. An airbag module includes a housing that supports the airbag and an inflator. A vehicle safety system includes a sensor and a controller. The sensor senses the occurrence of an event for which deployment of the airbag is desired and produces a signal indicative thereof. The controller is connected to the sensor and, in response to receiving the signal, actuates the inflator to inflate and deploy the airbag.

13 Claims, 4 Drawing Sheets

ROOF-MOUNTED OCCUPANT SAFETY SYSTEM FOR 360 DEGREE PROTECTION

TECHNICAL FIELD

The present invention relates generally to occupant safety systems and, in particular, relates to occupant safety systems including roof-mounted airbags for vehicles, such as autonomous vehicles, that have seats that can rotate.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Frontal airbags can be driver airbags or passenger airbags. When inflated, the driver and passenger airbags help protect the occupant from impacts with parts of the vehicle such as the instrument panel and/or a steering wheel of the vehicle.

Other types of airbags include side airbags and curtain airbags, both of which are inflatable between a seated occupant and a side structure of the vehicle. When inflated, the side and curtain airbags help protect the occupant from impacts with the side structure of the vehicle.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the vehicle structure that is common to current vehicle architecture.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the vehicle operator/driver. As a result, this also eliminates the necessity of vehicle passengers being positioned and oriented in the conventional manner described above. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well, pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surfaces.

SUMMARY

The invention relates to an occupant safety system in which an occupant restraint in the form of an airbag is mounted on the vehicle roof above an occupant seating position. The airbag is deployable downward from the vehicle roof and is configured to provide 360-degree protection. The airbag at least partially encircles or surrounds the occupant and a portion of the seat, e.g., the seatback, so that the seat and the roof can serve as a reaction surface for supporting the airbag. The airbag can therefore cushion the occupant and absorb impact forces resulting from a vehicle crash.

According to one aspect, an airbag helps protect an occupant of a vehicle having a roof and a cabin with a seat for the occupant. The airbag includes an upper portion for being mounted to a vehicle roof, a lower portion having a ring-shaped configuration configured to encircle the occupant and a seatback of the vehicle seat when deployed, and at least one pillar connecting the lower portion to the upper portion.

According to another aspect, the lower portion encircling the seatback can configure the lower portion to utilize the seatback as a reaction surface for supporting the lower portion against movement in response to an impacting occupant.

According to another aspect, alone or in combination with other aspects, the pillars can provide fluid communication from the upper portion to the lower portion and are configured to direct inflation fluid from the upper portion to the lower portion.

According to another aspect, alone or in combination with other aspects, the pillars can be spaced from each other. The airbag can also include windows defined between the pillars and bounded at a lower extent by the lower portion of the airbag.

According to another aspect, alone or in combination with other aspects, the airbag can be configured to allow the occupant to lean and/or bend forward and partially pass through the windows in response to a vehicle crash. The lower portion can be configured to conform to the leaned and/or bent forward occupant.

According to another aspect, alone or in combination with other aspects, the pillars can be configured to position the window in front of a forward-facing vehicle seat.

According to another aspect, alone or in combination with other aspects, the airbag can include four pillars spaced about the lower portion and defining four windows.

According to another aspect, alone or in combination with other aspects, the pillars can be configured to position one window in front of a forward-facing vehicle seat, one window outboard of the forward-facing vehicle seat, one window inboard of the forward-facing vehicle seat, and one window rearward of the forward-facing vehicle seat.

According to another aspect, alone or in combination with other aspects, the pillars can be interconnected to the lower portion at positions that are lateral to a seating surface of the vehicle seat when the airbag is deployed. The pillars can thereby be configured so that an occupant that moves laterally relative to the vehicle seat in response to a vehicle crash is received in a junction where a pillar interconnects with the lower portion.

According to another aspect, alone or in combination with other aspects, in response to receiving the laterally moving occupant, the lower portion can restrain and cushion the occupant primarily against forward movement relative to the vehicle seat. The pillar can restrain and cushion the occupant primarily against lateral movement relative to the vehicle seat.

According to another aspect, alone or in combination with other aspects, the lower portion can have a generally toroidal configuration, a generally circular cross-section, or a generally polygonal cross-section.

According to another aspect, alone or in combination with other aspects, an airbag module can include the airbag, an inflator that is actuatable to produce inflation fluid for inflating and deploying the airbag, and a housing for supporting the airbag and inflator on the vehicle roof.

According to another aspect, alone or in combination with other aspects, a vehicle safety system can include the airbag module. The vehicle safety system can further include a sensor for sensing the occurrence of an event for which deployment of the airbag is desired and producing a signal indicative thereof, and a controller connected to the sensor and, in response to receiving the signal, actuating the inflator to inflate and deploy the airbag.

Other objects and advantages and a fuller understanding of the invention will be had from the following detailed description and the accompanying drawings.

DETAILED DESCRIPTION

Figure 1:
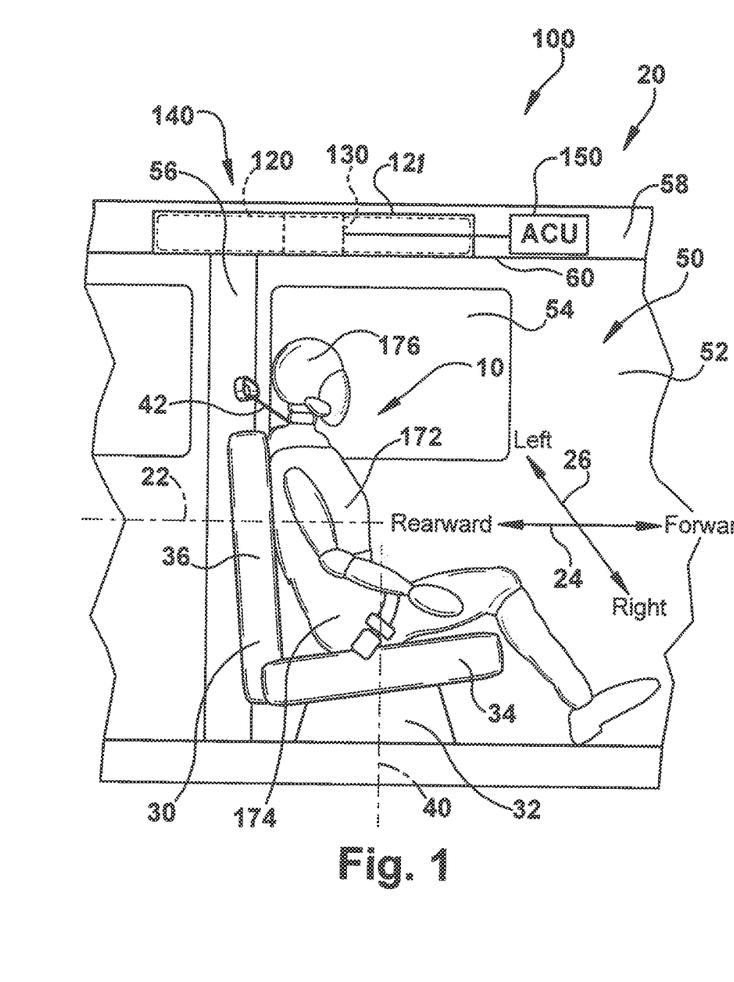
FIG. 1 is a side view of a vehicle including an example roof-mounted, occupant safety system, illustrating the system in a non-deployed condition.

The present invention relates generally to occupant safety systems including occupant restraints. In particular, relates to occupant safety systems including roof-mounted airbags in a vehicle where the occupants and the seats that they occupy can face in directions other than the typical forward facing vehicle seat. FIGS. 1-5 illustrate an example occupant safety system 100 for protecting an occupant 10 of a vehicle 20. The occupant 10 is seated on a vehicle seat 30 in a passenger cabin 50 of the vehicle 20. For purposes of reference in describing the position of the occupant 10 and other structures in or relative to the vehicle 20, arrows 24 are shown in FIGS. 1 and 4 to indicate fore/forward and aft/rearward longitudinal directions in the vehicle, along or parallel to a vehicle centerline 22. Left and right lateral directions in the vehicle are also shown by arrows 26. The left and right directions are viewed from the perspective of looking in the fore direction in the vehicle, and extend perpendicular to the centerline 22.

In this description, reference can also be made to inboard and outboard directions in the vehicle 20. The inboard direction is meant to refer to a lateral direction toward the vehicle centerline 22. The outboard direction is meant to refer to a lateral direction away from the vehicle centerline 22. Therefore, it will be appreciated that the lateral direction associated with inboard and outboard depend on the perspective from which those directions are observed. For example, from a driver side seating position, inboard is the right lateral direction and outboard is the left lateral direction. Conversely, from a passenger side seating position, inboard is the left lateral direction and outboard is the right lateral direction. Inboard and outboard for the forward-facing, driver side seated occupant 10 are shown in FIG. 4.

The vehicle 20 can be an autonomous vehicle, in which case the passenger cabin 50 can be without operator controls, such as a steering wheel, pedals, instrumentation, center console, etc. Accordingly, the instrument panel (not shown) can be reduced in size or removed altogether in order to maximize the space in the passenger cabin 50. The seating arrangements shown and described herein can therefore be illustrative of any seating position in the vehicle 20 (e.g., driver side/passenger side, $1^{st}$ row, $2^{nd}$ row, $3^{rd}$ row, etc.). In FIGS. 1-5, the passenger 10 is seated on a vehicle seat 30 on a left (viewed facing forward in the vehicle) or driver side of the vehicle, adjacent the vehicle side structure 52, which can include one or more side windows 54 and one or more pillars 56.

In the open configuration of the passenger cabin 50, the vehicle seats 30 can be configured, positioned, and arranged in a variety of manners, not constrained by the need to facilitate the conventional vehicle driver/operator arrangement. For example, the seats 30 can be arranged in rows that are forward-facing, in a manner similar to that of conventional automobiles. Alternatively, the seats 30 can be arranged in rows so that the occupants of the rows face each other, such as forward and rearward rows that face each other, and/or left and right rows that face inboard toward each other. Each seat 30 is fitted with a seatbelt 42 for restraining its occupant 10.

Individually, the seats 30 can be mounted on a swivel base 32, which allows the seats to rotate about a vertical seat axis 40. This can offer 360 degrees of rotation, where the occupant 10 can select the desired seat orientation. Alternatively, the seats 30 can be configured for indexed rotational positions, such as 15-degree increments. The rotational position of the seats 30 can thus be selected, for example, to provide the forward/rearward or left/right facing each other seating configurations described above. In this description, for the sake of clarity in explanation, the rotational position is considered to be at zero degrees in the forward-facing position, parallel to the vehicle centerline 22. Rotational positions can therefore be described in terms of degrees and direction, such as 15 degrees inboard, 90 degrees outboard, 180 degrees rearward, etc.

The seats 30 include a seat bottom 34, mounted on the seat base 32, for supporting the seated occupant 10. A seatback 36 extends vertically from the seat bottom 34. The seatback 36 can have a reclining configuration in which an angle of reclination can be selected by the occupant 10. The seat can also include a headrest (not shown) that extends upward from the seatback 36.

For the conventional, forward-facing seating arrangement of FIGS. 1-5, in the event of a frontal crash, the occupant 10 is restrained by the seatbelt 42. Additional restraints are, however, desirable to cushion and support torso, head, neck, and other body parts. In a conventional vehicle, this additional protection would typically be provided, at least for front row occupants, by instrument panel/steering wheel mounted airbags. In the autonomous vehicle 20 of FIGS. 1-5, however, the instrument panel can be reduced in size and/or removed altogether. Control interfaces for climate controls, GPS, navigation, entertainment, etc. can, for example, be provided in a center console area of the vehicle 20 located between the seat rows.

Because the front row seats need not be in close proximity to the instrument panel or the area where an instrument panel would normally reside, there can be a large volume of space between the front row and the forward cabin structure presented facing the front row. It therefore can be unfeasible to mount an airbag in the traditional vehicle structure, i.e., the instrument panel and/or steering wheel. In fact, this may be the case for any seating position in the vehicle, especially with the proposition of seats 30 that can swivel as described above.

It therefore becomes evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface presents additional challenges.

The occupant safety system 100 shown in FIGS. 1-5 includes at least one vehicle occupant protection device in the form of an inflatable airbag 120 mounted in the roof 58 of the vehicle 20. Mounting the airbags 120 in the vehicle roof 58 is convenient because the airbags can be positioned in a location with a desired proximity to the occupant(s) 10 they are intended to help protect. This can help reduce the necessary inflatable volume of the airbags 120 and can also help provide a desired airbag deployment time without requiring an excessively high-volume inflator.

The airbags 120 are housed/concealed in the roof structure of the vehicle 20 behind, for example, a roof liner 60. The airbag 120 is rolled/folded and packaged, e.g., in a sheath or housing 121, before being placed behind the roof liner 60. An inflator 130 is operatively connected to the airbag 120 and is actuatable to provide inflation fluid for inflating the airbag. The inflator 130 can be of any known type, such as stored gas, solid propellant, augmented or hybrid. The packaging/housing 121 can also contain or otherwise support the inflator 130.

The airbag 120, inflator 130, and any associated packaging or housing 121 can form an airbag module 140 that can be installed in the roof 58 as a unit. An airbag module 140 can, for example, be installed above each seat 30 of the vehicle, i.e., on a per seat basis. The occupant safety system 100 can therefore include multiple airbags 120 spaced about the vehicle roof 70 at locations associated and aligned with each seat 30. In other words, each seat 30 in the vehicle 20 can have its own associated individual airbag module 140.

The airbag 120 can be constructed of any suitable material, such as nylon (e.g., woven nylon 6-6 yarns), and may be constructed in any suitable manner. For example, the airbag 120 may include one or more pieces or panels of material. If more than one piece or panel is used, the pieces or panels can be interconnected by known means, such as stitching, ultrasonic welding, heat bonding, or adhesives, to form the airbag 120. The airbag 120 can be uncoated, coated with a material, such as a gas impermeable urethane, or laminated with a material, such as a gas impermeable film. The airbag 120 can therefore have a gas-tight or substantially gas-tight construction. Those skilled in the art will appreciate that alternative materials, such as polyester yarn, and alternatives coatings, such as silicone, may also be used to construct the airbag 120.

The system 100 also includes an airbag control unit (ACU) 150 that is operable to actuate the inflator(s) 130 in response to a vehicle crash. The ACU 150 is a central controller that communicates with one or more crash sensors (not shown) in order to determine the occurrence of a vehicle crash for which occupant protection is desired. The ACU 150 is operable to actuate the inflators 130 in response to detecting the vehicle crash.

Figure 2:
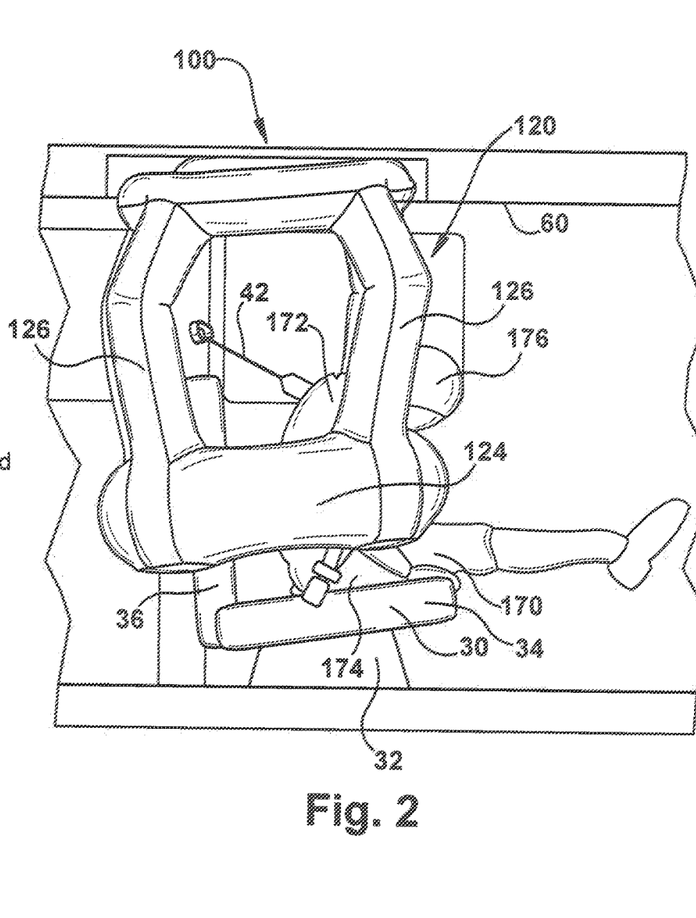
FIG. 2 is a side view of the vehicle of FIG. 1, illustrating the system in a deployed condition.
Figure 4:
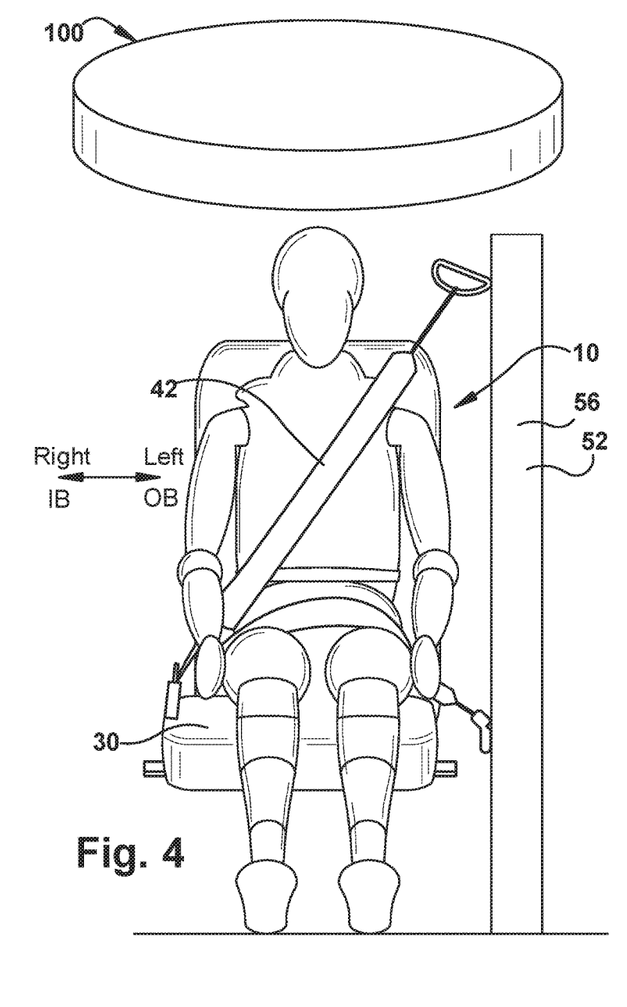
FIGS. 4 and 5 are front views illustrating the occupant safety system in non-deployed and deployed conditions, respectively, in a crash scenario resulting in forward occupant movement.
Figure 5:
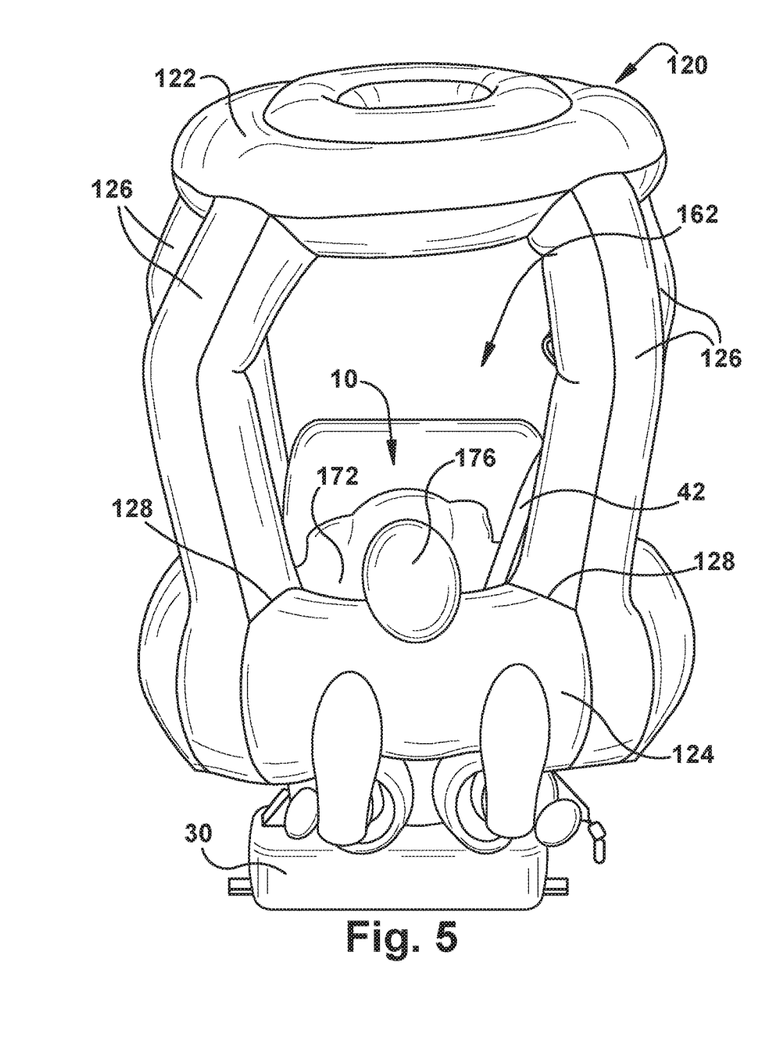

Upon sensing the occurrence of an event for which inflation of the airbag 120 is desired, such as a vehicle collision, the ACU 150 provides an actuation signal to the inflator 130. Upon receiving the signals from the ACU 150, the inflator 130 is actuated and provides inflation fluid to the inflatable volume of the airbag 120 in a known manner. The inflating airbag 120 exerts a force on the roof liner 60, which causes the roof liner to open (e.g., via tear seam or door) and release the airbag 120 to inflate and deploy from the stored condition (FIGS. 1 and 4) to the deployed condition (FIGS. 2 and 5). The airbag 120, while inflated, helps protect the vehicle occupant 10 by absorbing impacts with the occupant and cushioning the occupant's movement in response to the crash.

As shown in FIGS. 2 and 5, the airbag 120, when inflated and deployed, encircles the occupant 10 and the seat 30, particularly the seatback 36. The seatback 36 can therefore act as a reaction surface for supporting the airbag 120 against movement in response to a vehicle crash and the resulting occupant movement into engagement with the airbag. This allows the airbag 120 to absorb forces associated with the impacting occupant 10, which helps cushion and protect the occupant. In fact, as described and illustrated below, the vehicle seat 30/seatback 36 acts as the primary reaction surface for supporting the airbag 120 against occupant impact forces in a variety of crash scenarios.

Figure 3:
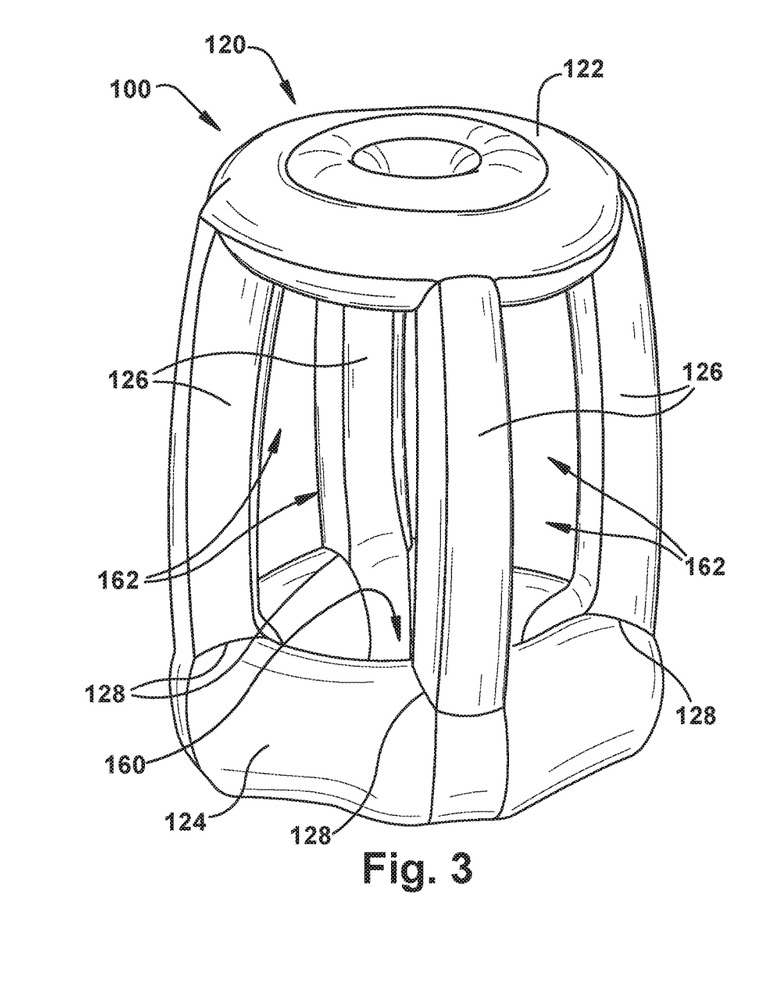
FIG. 3 is a perspective illustration of an occupant restraint in the form of an airbag that forms a portion of the system of FIGS. 1 and 2.

An example configuration of the airbag 120 alone, without the surrounding vehicle structure, occupant, and other components of the safety system, is shown in FIG. 3. The airbag 120 includes an upper portion 122 and a lower portion 124. The lower portion 124 is connected to the upper portion 122 by pillars 126. In the example configuration of FIG. 3, the airbag 120 includes four pillars 126 that extend between the upper and lower portions 122, 124. The airbag 120 could, however, include a different number of pillars, either greater than or less than four. The lower portion 124 defines a lower opening 160 of the airbag 120. The pillars 126 define openings or windows 162 of the airbag 120.

The upper portion 122 anchors the airbag 120 to the vehicle roof 58. The lower portion 124, encircling the vehicle seat 30 and the occupant 10, performs the primary occupant protection functions of the airbag 120. The pillars 126 provide inflation fluid conduits, delivering inflation fluid to the lower portion 124 from the upper portion 122, and can also provide some occupant protection functionality.

The inflator 130 can be centrally located in the upper portion 122 and can be configured to direct inflation fluid radially outward in a manner selected to deploy the lower portion 124 and pillars 126 in a desired manner. For example, the inflator 130 can be configured to deploy the lower portion 124 and pillars 126 in a uniform manner, such as uniformly downward from the vehicle roof 58. Additionally, the upper portion 122 can also be configured to help divide and direct the inflation fluid into the pillars 126 in order to produce this desired deployment. To do this, the upper portion 122 can include internal tethers or seams that create flow channels that direct inflation fluid into the conduits 126 in a manner selected to produce the desired deployment characteristics.

The configuration of the lower portion 124 can be any desired configuration or shape selected to encircle the occupant 10 and the seatback 36. The important characteristic of the configuration of the lower portion 124 is a confinement forming an inflated volume that encircles the occupant 10 and the vehicle seatback 36. The lower portion 124 does not require uniformity in cross-section or shape, although it may be advantageous to possess one or both of these characteristics. The important characteristic of the lower portion 124 is that it has a tubular configuration that encircles the occupant 10 and the seatback 36.

The closed tube configuration of the lower portion 124 can, for example, be generally toroidal. A "toroid," by definition, is a surface of revolution with a hole in the middle, forming a solid body. The axis of revolution passes through the hole and therefore does not intersect the surface. The classic example of a toroidal shape is when a circle is rotated around an axis parallel to one of its edges, forming a doughnut shape referred to specifically as a "torus." As another example, when a rectangle is rotated around an axis parallel to one of its edges, forming a hollow ring with a rectangular cross-section. From this, those skilled in the art will appreciate that the lower portion 124 can similarly be formed as hollow ring structures with cross-sections having various geometries, including regular and irregular shapes, polygons, etc.

By "generally toroidal," it is meant that the configuration of the lower portion 124 is or approximates a toroidal surface revolution. The lower portion 124 can, for example, have the configuration of a torus. This configuration may not be precise, i.e., the configuration can, in general, be that of a torus, with the understanding that the shape can vary or have imperfections due to a variety of factors. For example, the lower portion 124 can depart from a purely toroidal shape at the intersections with the pillars 126. As another example, the shape of the lower portion 124 can depart from a purely toroidal shape due to the woven and/or stitched together fabric construction of the airbag 120. The configuration of the lower portion 124 can also depart from toroidal in that the ring, instead of having a circular shape, can be configured to take the shape of a rounded square, rectangle, pentagon, hexagon, or other geometric form. Further, inflation dynamics may cause the lower portion to distort from the toroidal shape during the inflation process and even while deployed. Interactions with the vehicle and/or occupant can also distort the shape of the lower portion 124.

FIGS. 2 and 5 illustrate the safety system 100 deployed in response to a vehicle crash that results in the occupant 10 moving forward from the vehicle seat 30. The occupant movement is relative to the vehicle seat 30 and not necessarily the vehicle 20, as the seat can be rotated on the swivel base 32. In FIGS. 2 and 5, the forward movement of the occupant 10 relative to the vehicle seat 30 happens to coincide with forward movement of the vehicle 20. FIGS. 2 and 5 can therefore be illustrative of a vehicle frontal collision.

As shown in FIGS. 2 and 5, when the airbag 120 is deployed, the lower portion 124 encircles both the occupant 10 and the seatback 36. The airbag 120 can be configured to position the lower portion 124 on or near the occupant's legs 170 and torso 172, e.g., at or about the waist 174. In response to the vehicle crash, the occupant 10 moves forward relative to the seat 30, away from the seatback 36, into engagement with the lower portion 124 of the airbag 120. Restrained at the waist by a lap portion of the seatbelt 42, the occupant 10 bends forward about the waist 174, and his/her torso 172 bends or arches forward as shown. The occupant's upper torso 172 and head 176 can extend through the window 162 defined between the pillars 126. The lower portion 124 restrains and cushions the occupant 10, distributes impacts with the airbag 120 and provides a desired ride-down effect, i.e., a gradual deceleration of the forward-moving occupant.

The lower portion 124 is configured to receive the occupant 10 and conform or comply with the motion of the occupant in response to the vehicle crash. As shown in FIGS. 2 and 5, the cross-sectional shape of the lower portion 124 is shaped, i.e., round or rounded, and sized, i.e., diameter/cross-sectional area so that the lower portion both engages the occupant's torso 172 and receives the occupant's head 176. The shape of the lower portion 124 matches or resembles the natural forward arching of the occupant 10, restrained by the lap belt portion, while at the same time cushioning, distributing impact forces, and providing the desired ride-down effect.

Advantageously, the configuration and/or cross-sectional shape of the lower portion 124 can be selected to match or enforce a natural position of the occupant 10. This position can be that of an occupant having a physiology selected according to statistics that place that person within certain segments of the population. The lower portion 124 can, for example, be configured to match or resemble the physiology of an occupant sized according to National Highway Transportation Safety Administration (NHTSA) guidelines, such as a $50^{th}$ percentile male occupant, a $95^{th}$ percentile male occupant, or a $5^{th}$ percentile female.

Because the lower portion 124 encircles the seatback 36, the seatback restricts movement of the airbag 120 in response to receiving the impacting occupant 10. As the occupant 10 moves into engagement with the lower portion 124, the lower portion moves with the occupant away from the seatback 36. The portion of the lower portion 124 extending behind the seatback 36 engages the seatback, which restrains the lower portion from further movement. The seatback 36 acts as a reaction surface that supports the airbag 120 so that it can protect the occupant 10 by absorbing and distributing the forces associated with the occupant striking the airbag.

The vehicle roof 58 can also serve as a reaction surface for the airbag 120. Through the attachment of the upper portion 122 to the roof 58, the pillars 126 can become tensioned in response to the occupant 10 engaging and exerting forces on the lower portion 124. For example, viewing FIGS. 2 and 5, while the impact forces exerted on the lower portion 124 by the occupant 10 are primarily in the forward direction, it can be seen that the occupant also exerts some downward force on the lower portion due to their arching or bending forward motion. The roof 58 acts as a reaction surface against these vertical components of the occupant impacts with the airbag 120. The function of the roof 58 as a reaction surface can therefore be seen as secondary, as the seat 30/seatback 36 acts as the primary reaction surface for the airbag, particularly the lower portion 124.

Advantageously, because the lower portion 124 encircles the occupant 10 and has a uniform cross-sectional configuration (e.g., generally toroidal, see above), the airbag 120 can offer the occupant 10 a 360-degree level of protection.

Because the swivel base 32 can allow the occupant to be facing in a 360-degree user-selected position, vehicle crashes can result in the occupant moving, relative to the seat 30 in directions that vary from the forward direction illustrated in FIGS. 2 and 5. Additionally, even where the occupant 10 is seated in a forward-facing position, certain types of vehicle crashes can result in the occupant's moving in directions lateral to the vehicle seat 30 and/or forward direction.

By directions "lateral to the vehicle seat," it is meant to refer to movement at an angle relative to a front facing surface of the seat 30. The front facing surface of the vehicle seat 30 can be considered to be the surface of the seatback 36. Front facing, in this regard, is meant to refer to perpendicular to the seatback 36 and within the lateral confines of the seat. Movement in directions lateral to the front facing surface of the vehicle seat 30 would be diagonal movement forward of the seatback 36 and either to the right or to the left of the vehicle seat. For a forward facing vehicle seat 30, movements in directions lateral to the vehicle seat 30 would be forward and either inboard or outboard of the vehicle 20.

These lateral occupant movements can result from various crash scenarios. For example, lateral occupant movements can result from angular collisions—where the vehicle 20 and/or the object struck by the vehicle are travelling at an angle relative to each other. Lateral occupant movements can also result from offset collisions, where the vehicle 20 and/or the object struck by the vehicle are travelling parallel to each other, but their center of masses are offset from each other. Lateral occupant movements can also result from side impact collisions, where the vehicle 20 strikes or is struck from the side. Lateral occupant movements can also result from frontal collisions, or any type of collision for that matter, where the seat 30 is rotated away from the forward facing position.

Figure 6:
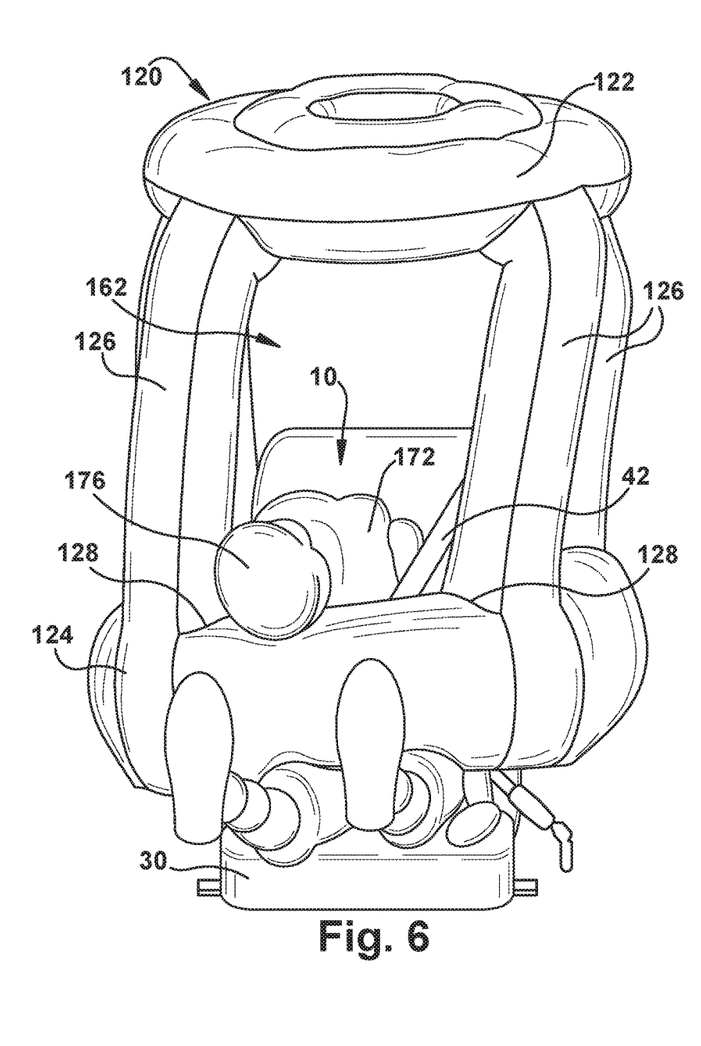
FIG. 6 is a front view illustrating the occupant safety system in a deployed condition in a crash scenario resulting in angular occupant movement.
Figure 7:
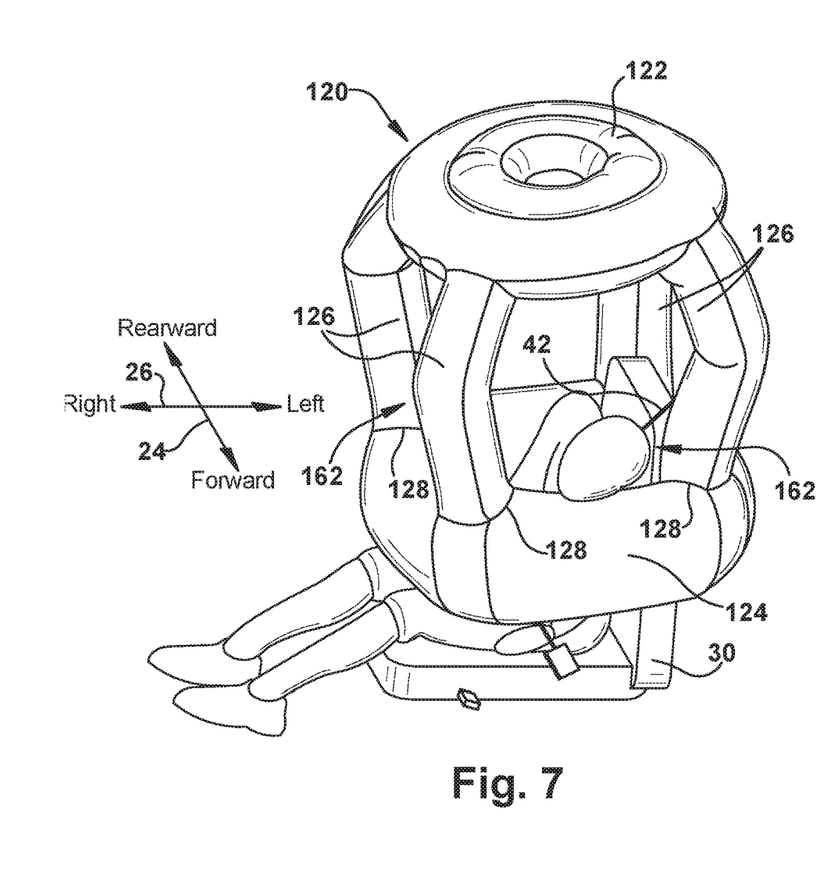
FIG. 7 is a front view illustrating the occupant safety system in a deployed condition in a crash scenario involving an occupant in a side-facing seat.
Figure 8:
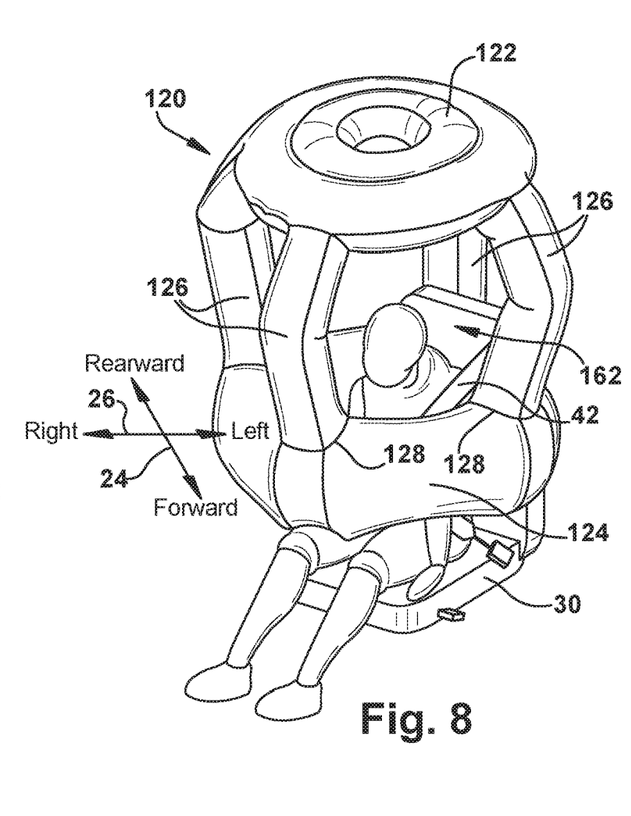
FIG. 8 is a front view illustrating the occupant safety system in a deployed condition in a crash scenario involving an occupant in an angular-facing seat.

The airbag 120 is configured to help protect the occupant 10 in any crash scenario where the occupant 10 moves laterally relative to the seat 30. FIGS. 6-8 illustrate examples of these crash scenarios. FIG. 6 illustrates a crash scenario where the seat 30 and occupant 10 are forward facing in the vehicle. FIG. 7 illustrates a crash scenario where the seat 30 is rotated 90-degrees from forward, i.e., facing inboard or outboard. FIG. 8 illustrates a crash scenario where the seat 30 is rotated 45-degrees from forward, i.e., facing 45-degrees inboard or outboard. In FIGS. 7-8, the forward and rearward directions in the vehicle are indicated by arrows labeled as such.

Referring to FIG. 6, it can be seen that the occupant 10 of the forward facing seat 30 moves into engagement with the airbag 120 in an lateral direction. This can, for example, be the result of an angular or offset vehicle collision. In this crash scenario, the airbag 120 offers several advantages. Since the lower portion 124 surrounds the occupant 10, it is positioned to receive the occupant, and is configured to coincide with the leaned or bent forward condition of the occupant. The lateral movement of the occupant 10 pulls on the lower portion 124 in a different, i.e., lateral, direction, does not deter the seatback 36 from acting as a reaction surface, along with the roof 58 via the pillars 126.

Additionally, in FIG. 6, the lateral movement of the occupant 10 can result in the occupant, especially the occupant's head 176, being received at the intersection or junction 128 of the lower portion 124 and a pillar 126. Advantageously, the pillar 126 can help provide additional restraint of the occupant 10 against lateral, inboard/outboard movement. The pillar 126 can also serve to cushion the occupant 10 against impacts with adjacent vehicle structure, such as the side structure 52 (in the case of lateral outboard occupant movement) or a center console or adjacent seat/occupant (in the case of lateral inboard occupant movement).

Referring to FIG. 7, the occupant 10 of the 90-degree rotated seat 30 moves laterally relative to the seat, in this case laterally, as indicated generally by the arrow, into contact with the airbag 120. FIG. 7 is thus illustrative of the occupant 10 of the 90-degree seat 30 being involved in a vehicle frontal collision, so the lateral movement of the occupant coincides with the forward direction in the vehicle. The occupant 10 moves in this lateral direction into engagement with the airbag 120. In this crash scenario, the airbag 120 offers several advantages. Since the lower portion 124 surrounds the occupant 10, it is positioned to receive the occupant, and is configured to coincide with the leaned or bent condition of the occupant. The seatback 36, along with the roof 58 via the pillars 126, act as a reaction surface for the airbag 120.

In the 90-degree rotated seat crash scenario of FIG. 7, the occupant 10, restrained at the waist 174 by the lap portion of the seatbelt 42, leans and or bends laterally. Lateral bending of the torso 172 and head/neck 176 is unnatural once the degree of bending goes beyond a certain extent. Advantageously, as shown in FIG. 7, the airbag 120 can be configured such that a pillar 126 is positioned to receive, or at least partially receive, the occupant 10 in this crash scenario. When this occurs, the pillar 126 not only helps cushion the occupant 10, but also helps prevent extreme lateral bending of the occupant. The pillar 126 can also serve to cushion the occupant 10 against impacts with adjacent vehicle structure or occupants. As the crash proceeds, the occupant 10 can be received in and cushioned by the junction 128 between the lower portion 124 and the pillar 126.

Referring to FIG. 8, the occupant 10 of the 45-degree rotated seat 30 moves laterally relative to the seat, in this case at a 45-degree angle relative to the seat, as indicated generally by the arrow, into contact with the airbag 120. FIG. 8 is thus illustrative of the occupant 10 of the 45-degree seat 30 being involved in a vehicle frontal collision, so the lateral movement of the occupant coincides with the forward direction in the vehicle. The occupant 10 moves in this lateral/angled direction into engagement with the junction 128 between the lower portion 124 and the pillar 126. In this crash scenario, the airbag 120 offers several advantages. Since the lower portion 124 surrounds the occupant 10, it is positioned to receive the occupant, and is configured to coincide with the leaned or bent condition of the occupant. The seatback 36, along with the roof 58 via the pillars 126, act as a reaction surface for the airbag 120.

In the 45-degree rotated seat crash scenario of FIG. 8, the occupant 10, restrained at the waist 174 by the lap portion of the seatbelt 42, leans and or bends laterally, i.e., at an angle both forwardly and laterally. Advantageously, as shown in FIG. 8, the airbag 120 can be configured such that the lower portion 124 initially receives and restrains the occupant 10. Depending on the severity of the crash scenario, further movement and penetration of the occupant into the lower portion 124 will result in the occupant moving or sliding along the lower portion into the junction 128 and engages the adjacent pillar 126. When this occurs, the pillar 126 helps cushion the occupant 10 against impacts with adjacent vehicle structure or occupants.

From the above, it will be appreciated that the example configurations of FIGS. 1-8 illustrate that the airbag 120 is configured to utilize the vehicle seat as the primary reaction surface for crash scenarios involving both conventional and unconventional seating arrangements. By "reaction surface," it is meant that it is the vehicle roof and the vehicle seat support the airbag against movement in response to an impacting occupant. In other words, the airbag attempts to move in a first direction and the roof and/or vehicle seat applies a reaction force to the airbag in a second, opposite (or substantially opposite) direction to limit/prevent movement of the airbag in the first direction. This allows the airbag to absorb impact forces of the occupant and provide the desired ride-down effect.

Advantageously, the example configurations can require only the vehicle roof and seat to provide the reaction surface and can provide effective occupant protection without requiring any support from structure presented forward of the occupants. In other words, the airbag need not deploy between the occupant and any particular vehicle structure so that the structure can support the airbag for occupant penetration. The vehicle roof and seat can support the airbag module and the airbag entirely. In certain example configurations, and under certain vehicle crash conditions, portion(s) of the airbag could come into contact with vehicle structure other than the roof/seat, such as a side window, that could act as an additional reaction surface. The point is, however, that this additional reaction surface is not necessary or required.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, although the vehicle safety system is described herein as being implemented in a vehicle with swivel base seats, the safety system can be implemented in a vehicle with fixed (e.g., forward facing) seats. Additionally, although the safety system is described herein as being implemented in a vehicle with one airbag per seat, the system can be implemented in a vehicle with one airbag per multiple seats (e.g., bench seating). Accordingly, the present invention is intended to embrace all such alterations, modifications and variations that fall within the spirit and scope of the appended claims.

We claim:

1. An airbag for helping to protect an occupant of a vehicle having a roof and a cabin with a seat for the occupant, comprising:
   an upper portion for being mounted to a vehicle roof;
   a lower portion having a ring-shaped configuration configured to encircle the occupant and a seatback of the vehicle seat when deployed; and
   a plurality of pillars connecting the lower portion to the upper portion and spaced apart from one another to define windows therebetween, the windows being bounded at a lower extent by the lower portion of the airbag, the airbag being configured to allow the occupant to lean and/or bend forward and partially pass through the windows in response to a vehicle crash, the lower portion being configured to conform to the leaned and/or bent forward occupant.

2. The airbag recited in claim 1, wherein the lower portion encircling the seatback configures the lower portion to utilize the seatback as a reaction surface for supporting the lower portion against movement in response to an impacting occupant.

3. The airbag recited in claim 1, wherein the pillars provide fluid communication from the upper portion to the lower portion and are configured to direct inflation fluid from the upper portion to the lower portion.

4. The airbag recited in claim 1, wherein the pillars are configured to position one of the windows in front of a forward-facing vehicle seat.

5. The airbag recited in claim 1, wherein the airbag comprises four pillars spaced about the lower portion and defining four windows.

6. The airbag recited in claim 5, wherein the pillars are configured to position one window in front of a forward-facing vehicle seat, one window outboard of the forward-facing vehicle seat, one window inboard of the forward-facing vehicle seat, and one window rearward of the forward-facing vehicle seat.

7. The airbag recited in claim 1, wherein the pillars are interconnected to the lower portion at positions that are lateral to a seating surface of the vehicle seat when the airbag is deployed, the pillars thereby being configured so that an occupant that moves laterally relative to the vehicle seat in response to a vehicle crash is received in a junction where a pillar interconnects with the lower portion.

8. The airbag recited in claim 7, wherein in response to receiving the laterally moving occupant, the lower portion restrains and cushions the occupant primarily against forward movement relative to the vehicle seat, and the pillar restrains and cushions the occupant primarily against lateral movement relative to the vehicle seat.

9. The airbag recited in claim 1, wherein the lower portion has a generally toroidal configuration.

10. The airbag recited in claim 9, wherein the lower portion is generally circular in cross-section.

11. The airbag recited in claim 9, wherein the lower portion is generally polygonal in cross-section.

12. An airbag module comprising:
    the airbag of claim 1;
    an inflator that is actuatable to produce inflation fluid for inflating and deploying the airbag; and
    a housing for supporting the airbag and inflator on the vehicle roof.

13. A vehicle safety system comprising the airbag module in claim 12.

* * * * *